United States Patent
Mahgerefteh et al.

(10) Patent No.: US 10,132,997 B2
(45) Date of Patent: Nov. 20, 2018

(54) ADIABATICALLY COUPLED OPTICAL SYSTEM

(71) Applicant: Finisar Corporation, Sunnyvale, CA (US)

(72) Inventors: Daniel Mahgerefteh, Los Angeles, CA (US); Bryan Park, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 15/596,958

(22) Filed: May 16, 2017

(65) Prior Publication Data

US 2017/0329081 A1   Nov. 16, 2017

Related U.S. Application Data

(60) Provisional application No. 62/337,245, filed on May 16, 2016, provisional application No. 62/397,185, filed on Sep. 20, 2016.

(51) Int. Cl.
*G02B 6/125* (2006.01)
*G02B 6/30* (2006.01)
(Continued)

(52) U.S. Cl.
CPC .......... *G02B 6/125* (2013.01); *G02B 6/1228* (2013.01); *G02B 6/305* (2013.01); *G02B 2006/1209* (2013.01); *G02B 2006/12061* (2013.01)

(58) Field of Classification Search
CPC ...... G02B 6/125; G02B 6/305; G02B 6/1228; G02B 2006/1209; G02B 2006/12061
See application file for complete search history.

(56) References Cited

U.S. PATENT DOCUMENTS

| | | | |
|---|---|---|---|
| 6,400,494 B1 * | 6/2002 | Kondo | G02F 1/0356 359/237 |
| 7,532,784 B2 | 5/2009 | Tolshikhin et al. | |

(Continued)

FOREIGN PATENT DOCUMENTS

| | | |
|---|---|---|
| EP | 0389172 A2 | 9/1990 |
| EP | 0561672 A1 | 9/1993 |

(Continued)

OTHER PUBLICATIONS

International Search Report and Written Opinion, as issued in connection with the International Patent Application No. PCT/US2015/060223, dated May 23, 2016, 13 pgs.

(Continued)

*Primary Examiner* — Ryan Lepisto
(74) *Attorney, Agent, or Firm* — Maschoff Brennan

(57) ABSTRACT

An optical system includes a silicon (Si) substrate, a buried oxide (BOX) layer formed on the substrate, a silicon nitride (SiN) layer formed above the BOX layer, and a SiN waveguide formed in the SiN layer. In some embodiments, the optical system may additionally include an interposer waveguide adiabatically coupled to the SiN waveguide to form a SiN-interposer adiabatic coupler that includes at least the tapered section of the SiN waveguide, the optical system further including at least one of: a cavity formed in the Si substrate at least beneath the SiN-interposer adiabatic coupler or an oxide overlay formed between a top of a SiN core of the SiN waveguide and a bottom of the interposer waveguide. Alternatively or additionally, the optical system may additionally include a multimode Si—SiN adiabatic coupler that includes a SiN taper of a SiN waveguide and a Si taper of a Si waveguide.

20 Claims, 16 Drawing Sheets

(51) Int. Cl.
*G02B 6/122* (2006.01)
*G02B 6/12* (2006.01)

(56) References Cited

U.S. PATENT DOCUMENTS

| | | | |
|---|---|---|---|
| 8,031,991 B2 * | 10/2011 | Webster | G02B 6/1228 385/28 |
| 8,041,164 B2 | 10/2011 | Granestrand et al. | |
| 9,405,066 B2 | 8/2016 | Mahgerefteh et al. | |
| 2009/0324163 A1 | 12/2009 | Dougherty et al. | |
| 2012/0076465 A1 | 3/2012 | Chen et al. | |
| 2012/0093456 A1 | 4/2012 | Taillaert et al. | |
| 2015/0316720 A1 | 11/2015 | Yang et al. | |
| 2015/0338577 A1 | 11/2015 | Shi et al. | |
| 2016/0047983 A1 | 2/2016 | Collins et al. | |
| 2016/0131837 A1 | 5/2016 | Mahgerefteh et al. | |
| 2016/0131842 A1 | 5/2016 | Mahgerefteh et al. | |

FOREIGN PATENT DOCUMENTS

| | | |
|---|---|---|
| EP | 2664949 A2 | 11/2013 |
| JP | H05216079 A | 8/1993 |
| WO | 2001088577 A1 | 11/2001 |
| WO | 2009106139 A1 | 9/2009 |
| WO | 2009106140 A1 | 9/2009 |
| WO | 2011/078789 | 6/2011 |
| WO | 2016077499 A2 | 5/2016 |
| WO | 2016077500 A2 | 5/2016 |

OTHER PUBLICATIONS

International Search Report and Written Opinion, as issued in connection with International Patent Application No. PCT/US2015/060224, dated May 13, 2016, 11 pgs.

Shani et al., "Integrated Optic Adiabatic Devices on Silicon," IEEE Journal of Quantum Electronics, IEEE Service Center, vol. 27, Issue 3, Mar. 1, 1991, 11 pgs.

Shani et al., "Integrated Optic Adiabatic Polarization Splitter on Silicon," Applied Physics Letter, American Institute of Physics, vol. 56, No. 2, Jan. 8, 1990, 2 pgs.

Invitation to Pay Additional Fees dated Feb. 15, 2018 in related PCT Application No. PCT/US2017/032978 (11 pages).

International Search Report and Written Opinion dated May 3, 2018, in related PCT Application No. PCT/US2017/032978.

\* cited by examiner

ADIABATICALLY COUPLED OPTICAL SYSTEM

CROSS-REFERENCE TO RELATED APPLICATIONS

This application claims the benefit of and priority to U.S. Prov. App. No. 62/337,245, filed May 16, 2016 and to U.S. Prov. App. No. 62/397,185, filed Sep. 20, 2016. Both of the foregoing applications are incorporated herein by reference in their entireties.

This application is related to U.S. Pat. No. 9,405,066, issued on Aug. 2, 2016 (hereinafter the '066 patent). The '066 patent is incorporated herein by reference in its entirety.

FIELD

Some embodiments discussed herein are related to adiabatically coupled optical systems.

BACKGROUND

Unless otherwise indicated herein, the materials described herein are not prior art to the claims in the present application and are not admitted to be prior art by inclusion in this section.

The '066 patent describes various two-stage adiabatically coupled optical systems. A thickness of a BOX layer included in such optical systems may have a significant effect on coupling efficiency of some adiabatic couplers.

In addition, if a tip width of a tapered section of a SiN waveguide in such optical systems can be made sufficiently small, e.g., at least as narrow as a threshold tip width, a polymer waveguide may be placed relatively close to the SiN waveguide, and in some cases in direct contact with the SiN waveguide. However, due to fabrication limits of a given fabrication process and/or other factors, it may be difficult or impossible to make the tip width of the tapered section as narrow as the threshold tip width.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to adiabatically coupled optical systems.

In an example embodiment, an optical system includes a Si substrate, a BOX layer, a SiN waveguide layer, a SiN waveguide, an interposer waveguide, and a cavity. The BOX layer may be formed on the Si substrate. The SiN waveguide layer may be formed above the BOX layer. The SiN waveguide may be formed in the SiN waveguide layer and may include a tapered section. The interposer waveguide may be adiabatically coupled to the SiN waveguide to form a SiN-interposer adiabatic coupler that includes at least the tapered section of the SiN waveguide. The cavity may be formed in the Si substrate at least beneath the SiN-interposer adiabatic coupler.

In another example embodiment, an optical system includes a Si substrate, a BOX layer, a SiN waveguide layer, a SiN waveguide, an interposer waveguide, and an oxide overlay. The BOX layer may be formed on the Si substrate. The SiN waveguide layer may be formed above the BOX layer. The SiN waveguide may be formed in the SiN waveguide layer and may include a tapered section. The interposer waveguide may be adiabatically coupled to the SiN waveguide to form a SiN-interposer adiabatic coupler that includes at least the tapered section of the SiN waveguide. The oxide overlay may be formed between a top of a SiN core of the SiN waveguide and a bottom of the interposer waveguide.

In another example embodiment, an optical system includes a Si substrate, a BOX layer, a Si waveguide layer, a multimode Si waveguide, a SiN waveguide layer, and a SiN waveguide. The BOX layer may be formed on the Si substrate. The Si waveguide layer may be formed above the BOX layer. The multimode Si waveguide may be formed in the Si waveguide layer and may include a Si taper with a tip width greater than or equal to 100 nanometers (nm). The SiN waveguide layer may be formed above the Si waveguide layer. The SiN waveguide may be formed in the SiN waveguide layer and may include a SiN taper. The SiN waveguide may be aligned in two orthogonal directions with the multimode Si waveguide, where the SiN taper does not overlap the Si taper.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which.

all arranged in accordance with at least one embodiment described herein.

DETAILED DESCRIPTION

Figure 1:
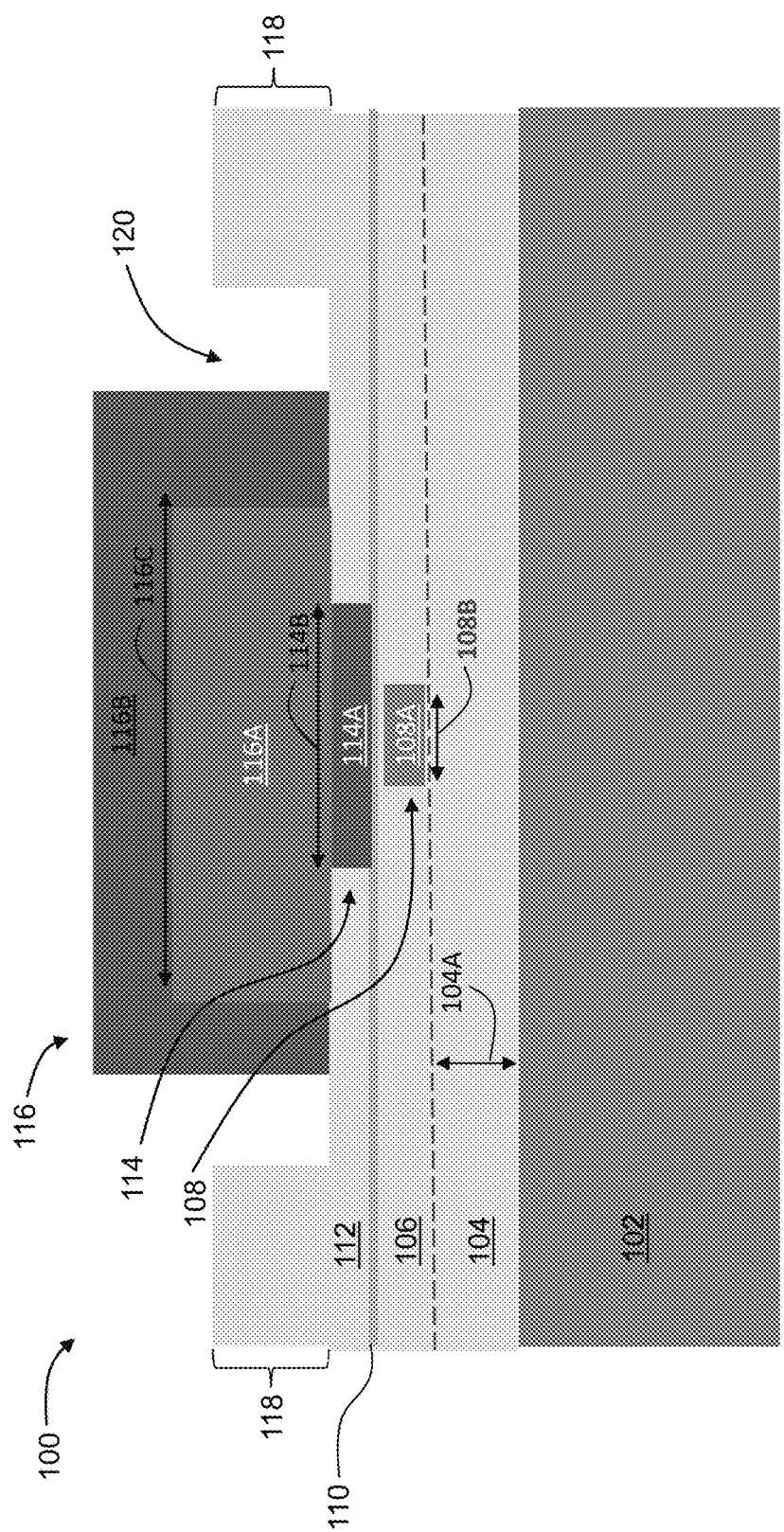
FIG. 1 illustrates a cross-sectional view of an example optical system that includes a two stage adiabatic coupler.

FIG. 1 illustrates a cross-sectional view of an example optical system 100 that includes a two stage adiabatic coupler as disclosed in the '066 patent, arranged in accordance with at least one embodiment described herein. In particular, FIG. 1 illustrates an example general stacking of layers of the optical system 100. The optical system 100 of FIG. 1 may include a silicon (Si) substrate 102, a buried oxide (BOX) layer 104 formed on the Si substrate 102, a Si waveguide layer 106 formed on the BOX layer 104 and that includes one or more Si waveguides 108, a silicon nitride (SiN) slab 110 formed on the Si waveguide layer 106, a SiN waveguide layer 112 formed on the SiN slab 110 and that includes one or more SiN waveguides 114, one or more polymer waveguides 116 included in a polymer interposer, and one or more dielectric layers 118 formed on the SiN waveguide layer 112. Alternatively, the one or more polymer waveguides 116 and polymer interposer may be substituted for one or more high index glass waveguides included in a high index glass interposer as described in the '066 patent, or other suitable interposer waveguides and interposer.

The '066 patent discloses various example details of the elements included in the optical system 100 as well as various alternative arrangements (e.g., different order of layers) and/or other embodiments. The principles disclosed herein may be implemented in combination with none or one or more of the details, alternative arrangements, and/or other embodiments of the '066 patent.

Each of the Si waveguides 108 includes a Si core 108A and a cladding. The cladding of each of the Si waveguides 108 may include, e.g., silicon dioxide ($SiO_2$) or other suitable material that may be included in the Si waveguide layer 106. Each of the SiN waveguides 114 includes a SiN core 114A and a cladding. The cladding of each of the SiN waveguides 114 may include, e.g., $SiO_2$ or other suitable material that may be included in the SiN waveguide layer 112. Each of the polymer waveguides 116 includes a polymer core 116A and a polymer cladding 116B.

One or more Si waveguides 108 in the Si waveguide layer 106 may be adiabatically coupled to one or more corresponding SiN waveguides 114 in the SiN waveguide layer 112. Analogously, one or more SiN waveguides 114 in the SiN waveguide layer 112 may be adiabatically coupled to one or more corresponding polymer waveguides 116 in the polymer interposer. The combination of a Si waveguide adiabatically coupled to a SiN waveguide may be referred to as a Si—SiN adiabatic coupler while the combination of a SiN waveguide adiabatically coupled to a polymer or other interposer waveguide may be referred to as a SiN-interposer adiabatic coupler. Light may propagate in either direction through a corresponding adiabatic coupler. The optical system 100 of FIG. 1 may be described as including a two stage adiabatic coupler. Embodiments described herein may more generally be implemented in optical systems with one or more stages of adiabatic couplers.

Adiabatic coupling as used herein is as described in the '066 patent. In general, the SiN waveguide 114, and more particularly the SiN core 114A, may have a tapered section to adiabatically couple light from the SiN waveguide 114 into the polymer waveguide 116, or vice versa, as described in more detail in the '066 patent. Similarly, in general, the Si waveguide 108, and more particularly the Si core 108A, may have a tapered section to adiabatically couple light from the Si waveguide 108 into the SiN waveguide 114, or vice versa, as described in more detail in the '066 patent.

The thicknesses or other dimensions of the layers and/or elements of the optical system 100 may have any suitable values. As an example, a width 116C of the polymer core 116A may be in a range from 6-7 micrometers (µm), a width 114B of the SiN core 114A may be about 700 nanometers (nm), a width 108B of the Si core 108A may be about 0.32 µm, and/or a thickness of the SiN slab 110 may be about 50 nm. Other examples values and/or ranges of values for these and other dimensions of example optical systems are described in more detail in the '066 patent.

In the optical system of FIG. 1, a thickness 104A of the BOX layer 104 may have a significant effect on coupling efficiency between the polymer waveguide 116 and the SiN waveguide 114 and/or between the SiN waveguide 114 and the Si waveguide 108. For instance, in general, the thinner the BOX layer 104, the greater the coupling of an optical field from a tapered section of the SiN waveguide 114 into the substrate 102 which leads to optical loss. A portion of the loss that results from coupling into the substrate 102 may be referred to as substrate leakage, leakage, or substrate loss, with or without "Si" preceding the foregoing terms.

Figure 2:
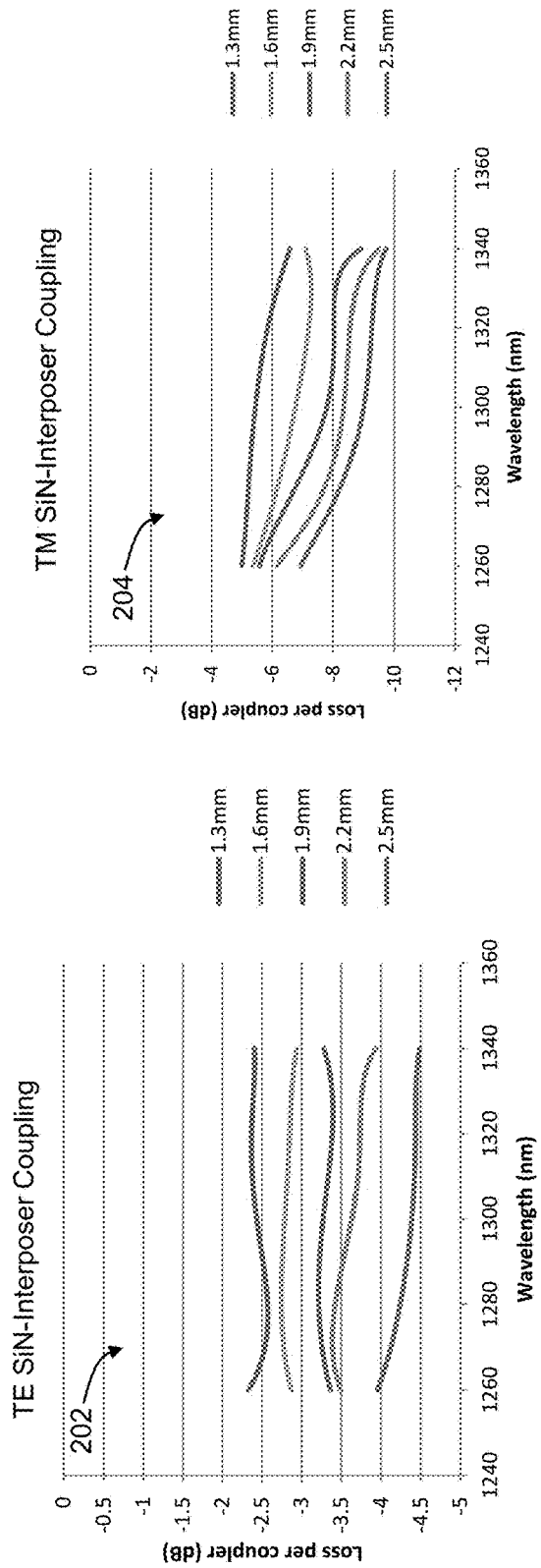
FIG. 2 includes simulations of loss per adiabatic coupler as a function of wavelength for various different tapered section lengths and various different polarization components of light for a SiN-interposer adiabatic coupler.

FIG. 2 includes simulations 202 and 204 of loss per adiabatic coupler (in decibels (dB)) as a function of wavelength for various different tapered section lengths and various different polarization components of light for a SiN-interposer adiabatic coupler, arranged in accordance with at least one embodiment described herein. In particular, a graph on the left includes simulations 202 for a transverse electric (TE) polarization component of light while a graph on the right includes simulations 204 for a transverse magnetic (TM) polarization component of light. Each of the two graphs includes five curves. The five curves in each graph include simulated loss per adiabatic coupler as a function of wavelength for tapered section lengths of, from top curve to bottom curve, 1.3 millimeters (mm), 1.6 mm, 1.9 mm, 2.2 mm, and 2.5 mm. As described and illustrated in FIG. 2, when substrate leakage is considered, longer tapered section length generally leads to higher total loss.

Some simulations that do not include substrate loss predict less than 1 dB coupling loss for each SiN-interposer adiabatic coupler. In such simulations, a longer tapered section length is predicted to reduce the coupling loss. However, measurements show that a long tapered section length results in higher loss. The higher loss is due to higher Si substrate leakage along the SiN tapered section. In particular, the optical mode expands as the SiN waveguide tapers to smaller width. Part of the light adiabatically couples to the polymer waveguide. However, a significant portion of the light couples to the Si substrate in the case that the thickness of the BOX layer (e.g., thickness 104A in FIG. 1) is less than about 1 µm, or even less than 1.5 µm.

Figure 3:
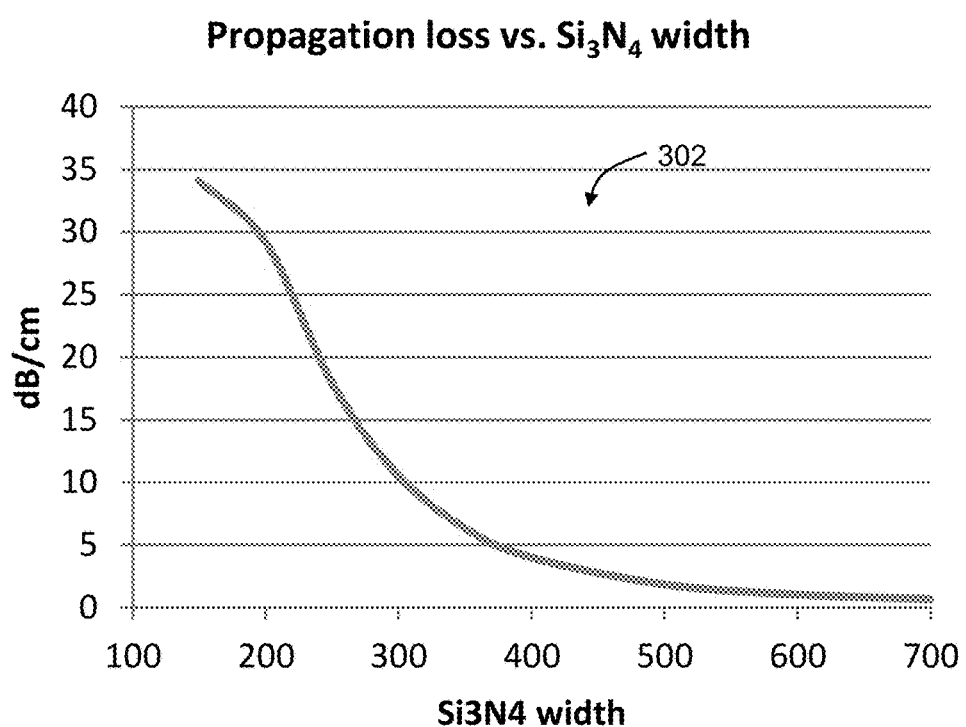
FIG. 3 includes a simulation of substrate leakage as a function of SiN taper width.

FIG. 3 includes a simulation 302 of substrate leakage as a function of SiN taper width, arranged in accordance with at least one embodiment described herein. As used herein, "SiN taper width" may refer to a width of a SiN tapered section at a narrowest part of the SiN tapered section. As illustrated and described in FIG. 3, substrate leakage increases with decreasing SiN taper width. The simulation 302 of FIG. 3 assumes a BOX layer thickness of 720 nm and also assumes that a material that makes up the SiN tapered section includes $Si_3N_4$.

Figure 4:
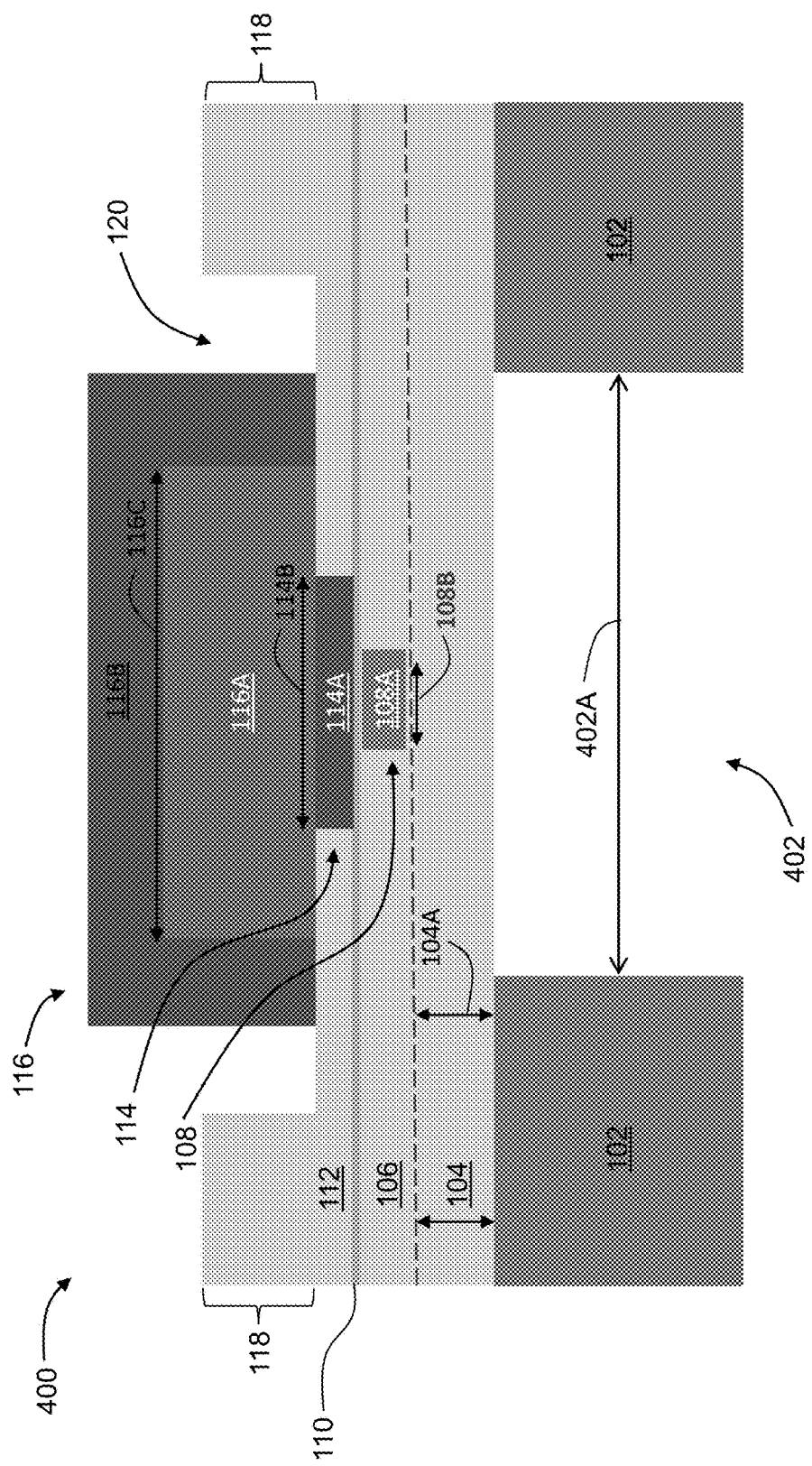
FIG. 4 illustrates a cross-sectional view of another example optical system that includes a two stage adiabatic coupler.

FIG. 4 illustrates a cross-sectional view of another example optical system 400 that includes a two stage adiabatic coupler, arranged in accordance with at least one embodiment described herein. The optical system 400 of FIG. 4 may reduce or eliminate Si substrate loss compared to the optical system 100 of FIG. 1. The optical system 400 may generally include the same similar elements or variations thereof as in the optical system 100 of FIG. 1, as denoted by use of the same reference numbers to refer to the same or similar elements.

In comparison to the optical system 100 of FIG. 1, in the optical system 400 of FIG. 4, some of the Si substrate 102 may be removed up to the BOX layer 104 beneath one or more adiabatic couplers to form a cavity 402 in the Si substrate 102 beneath the adiabatic coupler. A width 402A of the cavity 402 (e.g., in a direction orthogonal to a light propagation direction, where light propagation is in and out of the page in FIG. 4) may be at least 20 µm, at least 30 µm, or at least some other value. Where there are multiple adiabatic couplers generally side by side, which may be referred to as channels, a width 402A of the cavity 402 in the Si substrate 102 may be much larger than 20 µm to accommodate all of the channels. For instance, if a center-to-center spacing between adjacent channels is x µm and there are N adjacent channels, the width 402A of the cavity 402 may be at least N*x µm, or at least on the order of N*x µm. Alternatively or additionally, the width 402A of the cavity 402 in the Si substrate 102 may not exceed a threshold width to ensure mechanical robustness. The threshold width may be 1 mm in some embodiments.

In the optical system 400 of FIG. 4, removal of the substrate 102 to form the cavity 402 beneath a given adiabatic coupler may eliminate or at least reduce Si substrate loss compared to the optical system 100 of FIG. 1.

Figure 5:
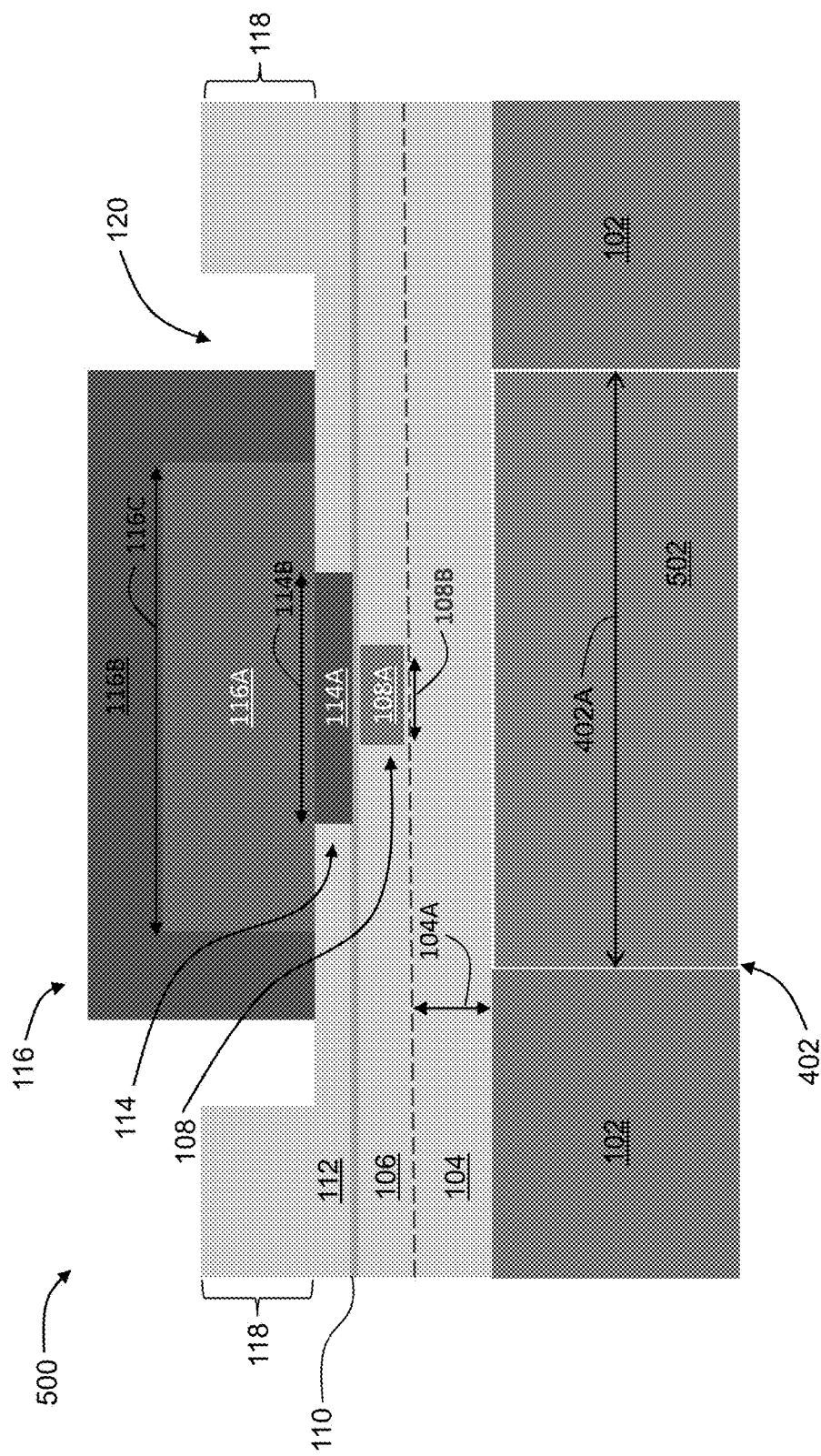
FIG. 5 illustrates a cross-sectional view of another example optical system that includes a two stage adiabatic coupler.

FIG. 5 illustrates a cross-sectional view of another example optical system 500 that includes a two stage adiabatic coupler, arranged in accordance with at least one embodiment described herein. Similar to the optical system 400 of FIG. 4, the optical system 500 of FIG. 5 may reduce or eliminate Si substrate loss compared to the optical system 100 of FIG. 1. The optical system 500 may generally include the same similar elements or variations thereof as in the optical systems 100 and/or 400 of FIGS. 1 and/or 4, as denoted by use of the same reference numbers to refer to the same or similar elements.

Compared to the optical system 400 of FIG. 4, the optical system 500 of FIG. 5 may further include a low index material 502 backfilled into the cavity 402 formed in the substrate 102. The low index material 502 may include epoxy or some other low index material. In some embodiments, an index of refraction of the low index material 502 may be between 1.4 and 1.6, such as 1.5 so as to not cause leakage of the optical mode from the SiN tapered section into the low index material 502. Backfilling the cavity 402 with the low index material 502 may improve a mechanical strength of the optical system 500 of FIG. 5 compared to the optical system 400 of FIG. 4 while still maintaining reduced and/or eliminated Si substrate leakage compared to the optical system 100 of FIG. 1.

Figure 6:
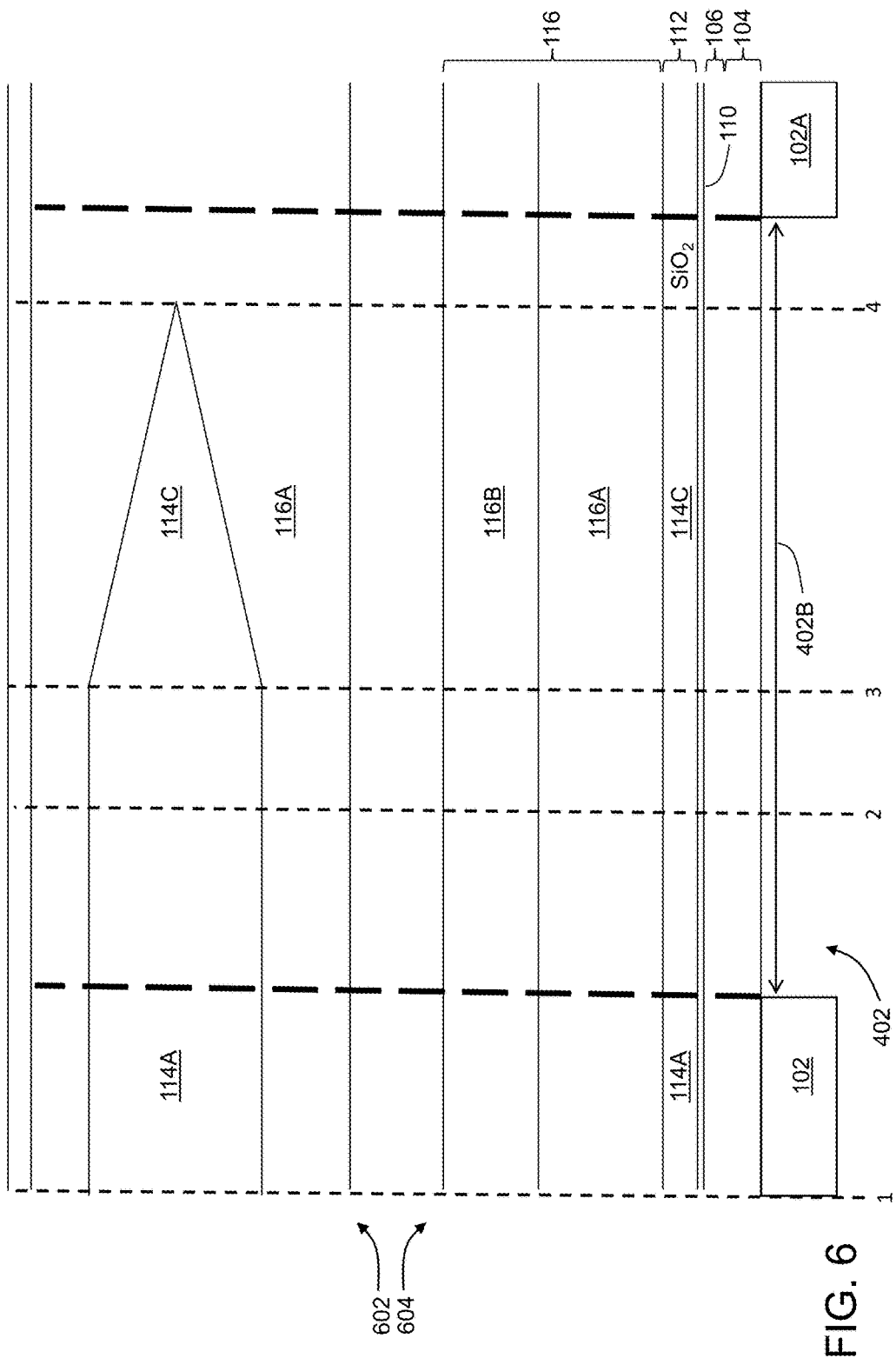
FIG. 6 includes an overhead view and a cross-sectional side view of a SiN-interposer adiabatic coupler of FIG. 4.

FIG. 6 includes an overhead view 602 and a cross-sectional side view 604 of a SiN-interposer adiabatic coupler of FIG. 4, arranged in accordance with at least one embodiment described herein. In the overhead view 602, footprints of various layers, elements, and/or features are depicted with the understanding that such layers, elements, and/or features may or may not be optically transparent and/or visually perceptible in actual implementation. In both views 602, 604 of FIG. 6, light propagation may generally be from left to right or right to left.

As illustrated in FIG. 6, the SiN core 114A of the SiN waveguide 114 may include a SiN tapered section 114C.

FIG. 6 additionally illustrates a length 402B of the cavity 402 formed in the substrate 102.

In some embodiments, the length 402B may be such that Si substrate leakage from the SiN tapered section 114C is eliminated or at least reduced. An adiabatic coupler, such as the SiN-interposer adiabatic coupler of FIG. 6, may have an interaction length. The interaction length may include a length over which a significant portion of light is adiabatically coupled from the SiN waveguide 114 to the polymer waveguide 116, or vice versa. The significant portion may be at least 70%, 80%, 90%, 95%, or some other portion. The length 402B of the cavity 402 may be on the order of the interaction length. In an example implementation, the length 402B of the cavity 402 may be in a range from 1.3 mm to 2.5 mm, depending on the taper design of the SiN tapered section 114C and/or mode profile of the polymer waveguide 116 or other interposer waveguide.

In addition, beyond the end or tip of the SiN tapered section 114C in the case of light propagating from left to right, or before the end or tip of the SiN tapered section 114 in the case of light propagating from right to left, most of the light is carried in the polymer waveguide 116. The polymer waveguide 116 may not suffer Si substrate loss since it may be more than a threshold distance (1.5 µm in this example) away from the substrate 102 in some embodiments. Accordingly, the substrate 102 need not be removed beyond the end or tip of the SiN tapered section 114C in the case of light propagating from left to right or before the end or tip of the SiN tapered section 114 in the case of light propagating from right to left where the light is substantially guided in the polymer waveguide 116, although it can be if desired. Instead, the substrate 102 may be kept near and/or along an edge of a chip that includes an SiN-interposer adiabatic coupler such as illustrated in FIG. 6 for mechanical support. A portion of the substrate 102 near and/or along the edge of the chip is denoted in FIG. 6 at 102A, and is referred to hereinafter as the substrate end perimeter portion 102A. The substrate end perimeter portion 102A may have a length (e.g., in the light propagation direction left-to-right or right-to-left of FIG. 6) of 250 µm or more in some embodiments.

Figure 7A:
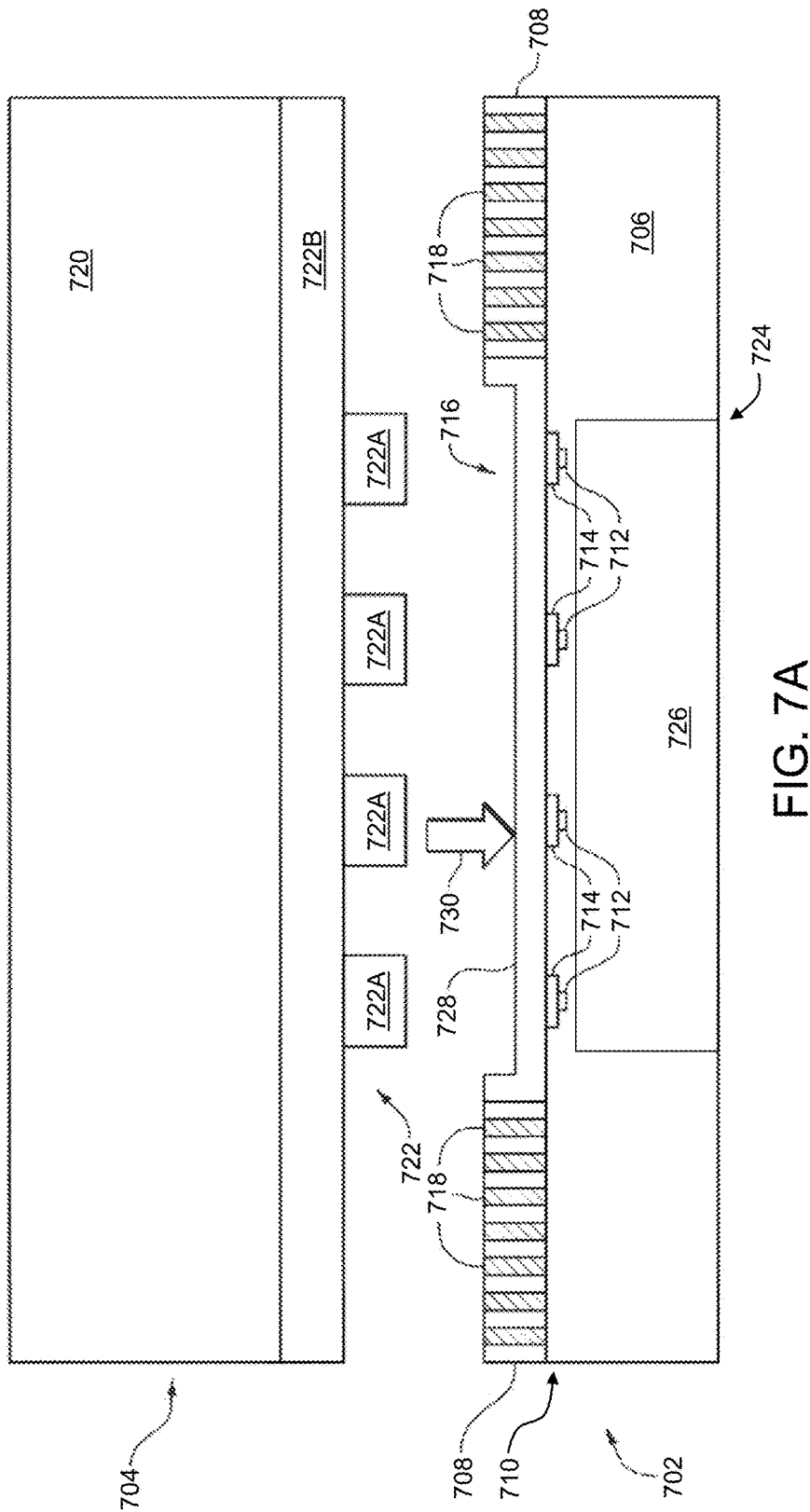
FIGS. 7A and 7B are side views that depict alignment and attachment of another optical system.
Figure 7B:
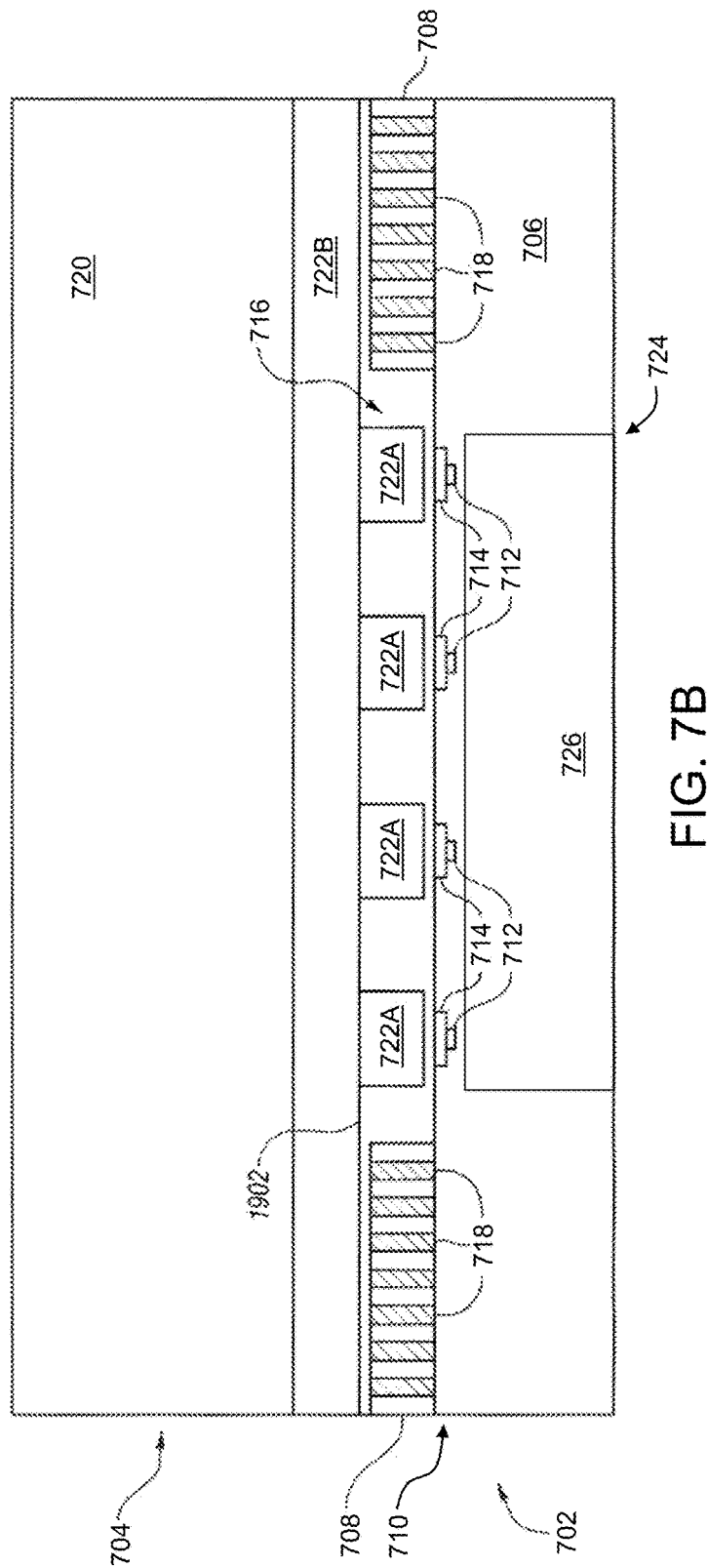

FIGS. 7A and 7B are side views that depict alignment and attachment of another optical system 700, arranged in accordance with at least one embodiment described herein. The optical system 700 includes an Si photonic integrated circuit (PIC) 702 and an interposer 704.

The Si PIC 702 includes a substrate 706, one or more dielectric layers 708, and one or more other layers 710 such as described with respect to FIGS. 1, 4, and 5. In particular, the substrate 702 may include or correspond to the substrate 102 of FIGS. 1, 4, and 5. The dielectric layers 708 may include or correspond to the one or more dielectric layers 118 of FIGS. 1, 4, and 5. The other layers 710 may include or correspond to the BOX layer 104, the Si waveguide layer 106, the SiN slab 110, and/or the SiN waveguide layer 112 of FIGS. 1, 4, and 5. Within corresponding layers of the other layers 710, the Si PIC 702 additionally includes multiple Si waveguides 712 and multiple SiN waveguides 714 that may respectively include or correspond to the Si waveguide 108 and the SiN waveguide 114 of FIGS. 1, 4, and 5. Each of the Si waveguides 712 includes a Si tapered section and each of the SiN waveguides 714 includes a SiN tapered section.

The Si PIC 702 defines an etched window 716 formed in the dielectric layers 708 above the SiN waveguides 714. The etched window 716 may be bounded on three sides (two of which are visible in FIGS. 7A and 7B) by the dielectric layers 708. At least a topmost one of the dielectric layers 708 may include metal dummies 718 at least in a region that bounds the etched window 716. Only some of the metal dummies 718 are labeled in FIGS. 7A and 7B for simplicity.

The interposer 704 includes an interposer substrate 720 and multiple interposer waveguides 722, each of which includes an interposer core 722A and interposer cladding 722B. In the example of FIGS. 7A and 7B, the interposer 704 may include a polymer interposer such that the interposer substrate 720, the interposer cores 722A, and the interposer cladding 722B respectively include a polymer substrate, polymer cores, and polymer cladding.

The Si tapered sections of the Si waveguides 712 may be aligned in two orthogonal directions with corresponding portions of the SiN waveguides 714 to form Si—SiN adiabatic couplers. Analogously, the SiN tapered sections of the SiN waveguides 714 may be aligned in two orthogonal directions with corresponding portions of the interposer waveguides 722 to form SiN-interposer adiabatic couplers.

Similar to FIGS. 4 and 5, a cavity 724 may be defined in the substrate 706, e.g., beneath the SiN-interposer adiabatic couplers. Optionally, a low index material 726 may be backfilled into the cavity 706. The cavity 724 and the low index material 726 may respectively include or correspond to the cavity 402 and the low index material 502 of FIGS. 4 and 5.

With combined reference to FIGS. 7A and 7B, the etched window 716 may be at least partially filled with epoxy underfill 728. To attach the interposer 702 and the Si PIC 702 together, the interposer 704 may then be moved towards the Si PIC 702 (or vice versa) as indicated by an arrow 730 in FIG. 7A until the interposer cores 722A are in direct or at least close contact with the SiN waveguides 714, as illustrated in FIG. 7B. As used herein, direct contact between two components or elements means the two components are actually touching each other. Close contact as used herein means the two components are sufficiently close for light to be optically coupled from one component to the other. Such components in close contact may optionally include between the two components air, epoxy, other adhesive, an overlay of at least partially optically transmissive material, or other material. An example that includes an overlay is described below with respect to FIG. 8. Any descriptions herein referring to direct contact can also include close contact. As illustrated in FIG. 7B, there may be sufficient underfill epoxy 728 to overflow the etched window 716 so as to epoxy the top of the dielectric layers 708 to the interposer cladding 722B of the interposer 720.

Referring to FIGS. 1, 4, and 5, a window 120 may be formed in the dielectric layers 118 at least above tapered sections of the one or more SiN waveguides 114 to allow them to be adiabatically coupled to the one or more polymer waveguides 116. The window 120 may include or correspond to the etched window 716 of FIGS. 7A and 7B. Within the window 120, each of the polymer cores of the polymer waveguides 116 may be in direct contact or at least close contact with a corresponding one of the SiN waveguides 114. As previously indicated, such components in close contact may optionally include between the two components an overlay, an example of which is described with respect to FIG. 8.

Figure 8:
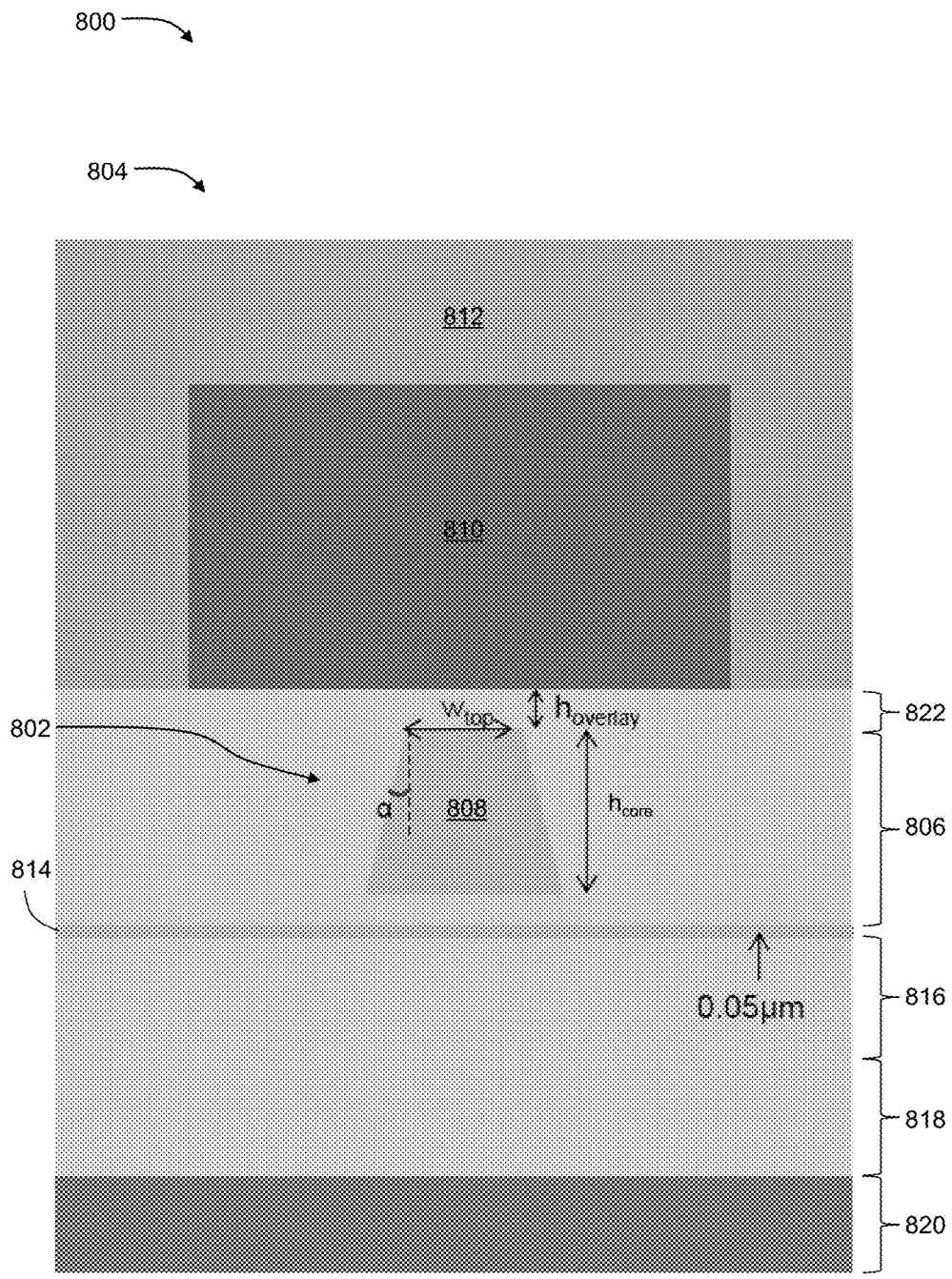
FIG. 8 illustrates an example SiN-interposer adiabatic coupler that may be included in an optical system.

In more detail, FIG. 8 illustrates an example SiN-interposer adiabatic coupler that may be included in an optical system 800, arranged in accordance with at least one embodiment described herein. The optical system 800 may include or correspond to the optical system 100, 400, or 500 of FIG. 1, 4, or 5. The SiN-interposer adiabatic coupler included in the optical system 800 of FIG. 8 includes a SiN waveguide 802 and a polymer waveguide 804. Similar to FIGS. 1, 4, and 5, FIG. 8 is a cross-sectional view in which the SiN waveguide 802 and the polymer waveguide 804 come in and out of the page.

The SiN waveguide 802 may be formed in a SiN waveguide layer 806 of the optical system 800. The SiN waveguide 802 and the SiN waveguide layer 806 may respectively include or correspond to the SiN waveguide 114 and the SiN waveguide layer 112 of FIGS. 1, 4, and 5. Analogous to the SiN waveguide 114 of FIG. 1, the SiN waveguide 802 may include a SiN core 808 and a cladding made up of surrounding $SiO_2$ or other suitable material from, e.g., the SiN waveguide layer 806.

The polymer waveguide 804 may be formed in a polymer interposer. The polymer waveguide 804 and the polymer interposer may respectively include or correspond to the polymer waveguide 116 and the polymer interposer of FIG. 1. Analogous to the polymer waveguide 116 of FIG. 1, the polymer waveguide 804 may include a polymer core 810 and a polymer cladding 812.

The optical system 800 may additionally include a SiN slab 814 on or at least above which the SiN waveguide layer 806 is formed, a Si waveguide layer 816 with one or more Si waveguides (not shown) and on or at least above which the SiN slab 814 is formed, a BOX layer 818 on or at least above which the Si waveguide layer 816 is formed, and a Si substrate 820 on or at least above which the BOX layer 818 is formed. In other embodiments, the various layers of the optical system 800 may have other arrangements, such as described in the '066 patent. The SiN slab 814, the Si waveguide layer 816, the BOX layer 818, and the Si substrate 820 may respectively include or correspond to the SiN slab 110, the Si waveguide layer 106, the BOX layer 104, and the Si substrate 102 of FIGS. 1, 4, and/or 5.

FIG. 8 additionally illustrates various parameters that may be associated with the optical system 800 of FIG. 8. As illustrated, the SiN waveguide 802, and more particularly the SiN core 808, may include a trapezoidal cross-sectional shape with a top that has a width $w_{top}$ and with a height $h_{core}$. An angle between a sidewall of the SiN waveguide 802 and a line normal to the top of the SiN waveguide 802 is referred to as the sidewall angle α. As illustrated in FIG. 8, an oxide overlay 822 is provided between the top of the SiN waveguide 802 and a bottom of the polymer waveguide 804, which oxide overlay 822 may have a thickness or height $h_{overlay}$. The oxide overlay 822 may include $SiO_2$ or other suitable oxide layer. The oxide overlay 822 may be included as part of the SiN waveguide layer 806 or separate therefrom and may function as, e.g., a top cladding of the SiN waveguide 802.

As described in the '066 patent, an adiabatic transition for an optical signal traveling from the SiN waveguide 802 to the polymer waveguide 804 (or vice versa) may be achieved by changing the structure and/or an effective index of a tapered section of the SiN waveguide 802 in a sufficiently slow manner so light is not scattered from its mode when it is incident on the tapered section of the SiN waveguide 802 and continues propagating in this same mode when it exits the tapered section of the SiN waveguide 802 and enters the polymer waveguide 804. That is, the light may experience a gradual transition between the tapered section of the SiN waveguide 802 and the vertically displaced polymer waveguide 804 such that the mode does not change and no significant scattering of light takes place. Accordingly, the tapered section of the SiN waveguide 802 combined with a portion of the polymer waveguide 804 vertically displaced therefrom is an example of an adiabatic coupler.

If the tip width of the tapered section of the SiN waveguide 802 can be made sufficiently small, e.g., at least as narrow as a threshold tip width, the polymer waveguide 804 may be placed relatively close to the SiN waveguide 802, and in some cases in direct contact with the SiN waveguide 802. However, due to fabrication limits of a given fabrication process and/or other factors, it may be difficult or impossible to make the tip width of the tapered section as narrow as the threshold tip width. In these and other embodiments, the oxide overlay 822 may be provided between the SiN waveguide 802 and the polymer waveguide 804 to compensate for a reduction in coupling efficiency that may occur when the tip width of the tapered section of the SiN waveguide 802 is not made at least as narrow as the threshold tip width. In these and other embodiments, increasing the thickness $h_{overlay}$ of the oxide overlay 822 may improve overall coupling efficiency from the SiN waveguide 802 to the polymer waveguide 804 or vice versa. Alternately or additionally, increasing the thickness $h_{overlay}$ of the oxide overlay 822 may reduce effective index of the light mode in the SiN waveguide 802 for a TM polarization of light to improve coupling efficiency from the SiN waveguide 802 to the polymer waveguide 804 or vice versa.

Figure 9:
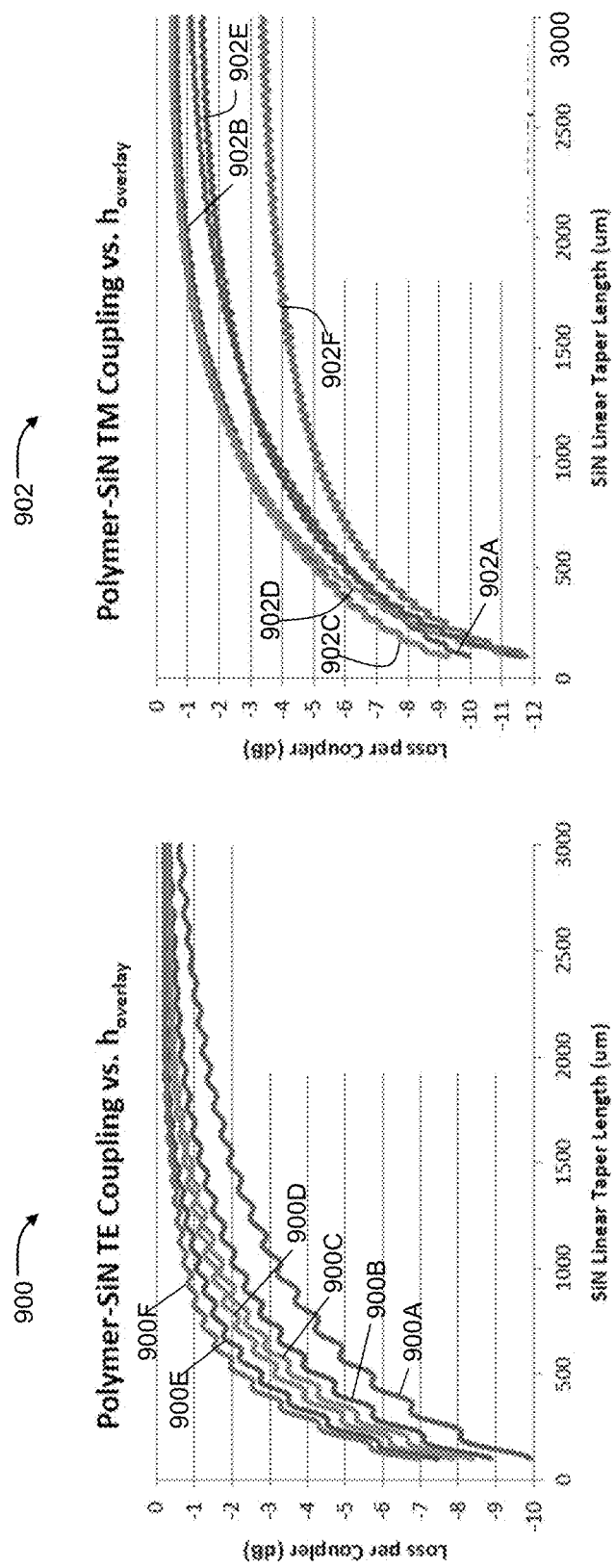
FIG. 9 illustrates two sets of simulations of SiN-interposer coupling efficiency as a function of taper length of the tapered section of an SiN waveguide for the adiabatic coupler of FIG. 8 for various overlay thicknesses $h_{overlay}$.

FIG. 9 illustrates two sets of simulations 900 and 902 of SiN-interposer coupling efficiency as a function of taper length of the tapered section of the SiN waveguide 802 for the adiabatic coupler of FIG. 8 for various overlay thicknesses $h_{overlay}$, arranged in accordance with at least one embodiment described herein. The sets of simulations 900 and 902 of FIG. 9 assume that the width $w_{top}$ of the SiN waveguide 802 is 180 nm, the sidewall angle α of the SiN waveguide 802 is 3°, the BOX layer 818 has a thickness of 1.5 μm, and Si substrate leakage is included in the sets of simulations 900 and 902.

The first set of simulations 900 is for a TE polarization of light and includes a first simulation 900A for an overlay thickness $h_{overlay}$ of 350 nm, a second simulation 900B for an overlay thickness $h_{overlay}$ of 250 nm, a third simulation 900C for an overlay thickness $h_{overlay}$ of 200 nm, a fourth simulation 900D for an overlay thickness $h_{overlay}$ of 150 nm, a fifth simulation 900E for an overlay thickness $h_{overlay}$ of 100 nm, and a sixth simulation 900F for an overlay thickness $h_{overlay}$ of 50 nm.

The second set of simulations 902 is for the TM polarization of light and includes a first simulation 902A for the overlay thickness $h_{overlay}$ of 350 nm, a second simulation 902B for the overlay thickness $h_{overlay}$ of 250 nm, a third simulation 902C for the overlay thickness $h_{overlay}$ of 200 nm, a fourth simulation 902D for the overlay thickness $h_{overlay}$ of 150 nm, a fifth simulation 902E for the overlay thickness $h_{overlay}$ of 100 nm, and a sixth simulation 902F for the overlay thickness $h_{overlay}$ of 50 nm. It can be seen from the second set of simulations 902, and particularly from the simulations 902B-902D, that the TM loss improves from about 3.5 dB to about 0.5 dB from about 0.75 mm to about 3 mm of tapered section length at the overlay thicknesses of 150 nm-250 nm. While overlay thicknesses $h_{overlay}$ of 150 nm-250 nm (simulations 902B-902D) reduce loss to about 0.5 dB at the 3 mm taper length, the thicknesses of 50 nm (simulation 902F), 100 nm (simulation 902E), and 350 nm (simulation 902A) may also reduce loss at the 3 mm taper length compared to omitting the oxide overlay 222 altogether when the tip width of the tapered section of the SiN waveguide 202 is not made at least as narrow as the threshold tip width. Thus, embodiments described herein may generally include oxide overlay thickness in a range from 50 nm-350 nm, and more particularly in a range from 150 nm-250 nm, and more particularly about 200 nm (e.g., 200 nm plus or minus 10%).

Figure 10:
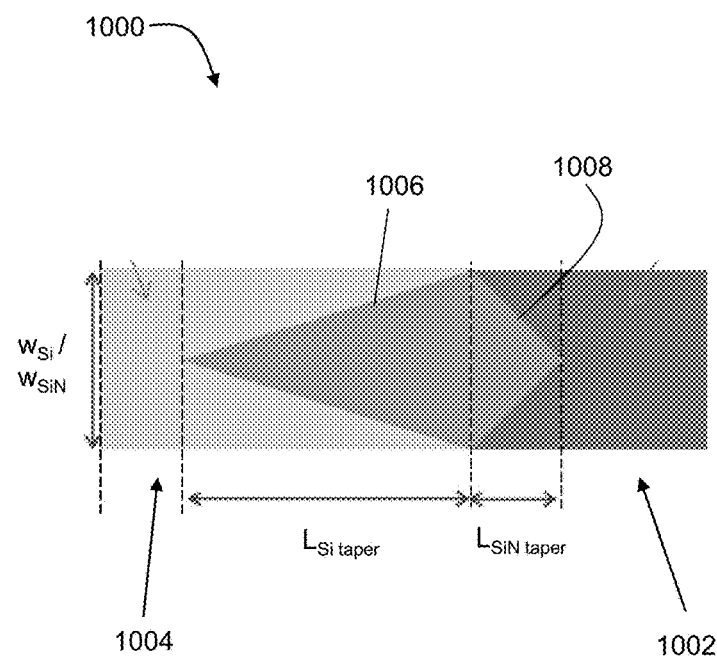
FIG. 10 is an overhead view of an example SiN—Si multimode adiabatic coupler.

Embodiments described herein may alternately or additionally include a SiN—Si multimode adiabatic coupler to relax Si tip width fabrication tolerance. FIG. 10 is an overhead view of an example SiN—Si multimode adiabatic coupler 1000 (hereinafter "coupler 1000"), arranged in accordance with at least one embodiment described herein.

The coupler 1000 may be included in any of the optical systems described herein, such as in any of the optical systems 100, 400, 500, 800 of FIGS. 1, 4, 5, and/or 8. The coupler 1000 includes a Si waveguide 1002 and a SiN waveguide 1004. Each of the Si waveguide 1002 and the SiN waveguide 1004 includes a core, e.g., of Si for the Si waveguide 1002 or of SiN for the SiN waveguide 1004, and a cladding (not shown). In the example of FIG. 10, the SiN waveguide 1004 is vertically displaced above the Si waveguide 1002 and is illustrated as semi-transparent to show the Si waveguide 1002 therebeneath. In other embodiments, the SiN waveguide 1004 may be vertically displaced below the Si waveguide 1002.

Each of the Si waveguide 1002 and the SiN waveguide 1004 includes a tapered section at an end thereof. In particular, the Si waveguide 1002 includes a Si taper 1006 and the SiN waveguide 1004 includes a SiN taper 1008. An end of the Si waveguide 1002 opposite the Si taper 1006 may be optically coupled to an optical receiver, such as a germanium (Ge) detector. The coupler 1000 may be configured to adiabatically couple light from the SiN waveguide 1004 through the SiN taper 1008 and the Si taper 1006 into the Si waveguide 1002, which light may then be coupled out to the Ge detector or other optical receiver.

From left to right in FIG. 10, the Si taper 1006 may gradually change from a relatively narrow tip to a multimodal waveguide with a width $w_{Si}$ suitable for multimode optical signals. In an example implementation, the width of the relatively narrow tip of the Si taper 1006 may be in a range from 100-120 nm and the width $w_{Si}$ may be about 1 µm. A length of the Si taper 1006 is denoted in FIG. 10 as $L_{Si\ taper}$. Above the Si taper 1006, the SiN waveguide 1004 may have a constant width and/or height, e.g., the portion of the SiN waveguide 1004 above the Si taper 1006 does not taper.

Also from left to right in FIG. 10, the SiN taper 1008 may taper down from a width $w_{SiN}$ suitable for multimode optical signals to a relatively narrow tip. In an example implementation, the width $w_{SiN}$ may be about 1 µm and the width of the relatively narrow tip of the SiN taper 1008 may be around 250 nm. Although the widths $w_{Si}$ and $w_{SiN}$ are equivalent in this example, in other embodiments they may be different. A length of the SiN taper 1008 is denoted in FIG. 10 as $L_{SiN\ taper}$, and may be about 0.01 mm in some embodiments. Below the SiN taper 1008, the Si waveguide 1002 may have a constant width and/or height, e.g., the portion of the Si waveguide 1002 below the SiN taper 1008 does not taper.

Figure 11:
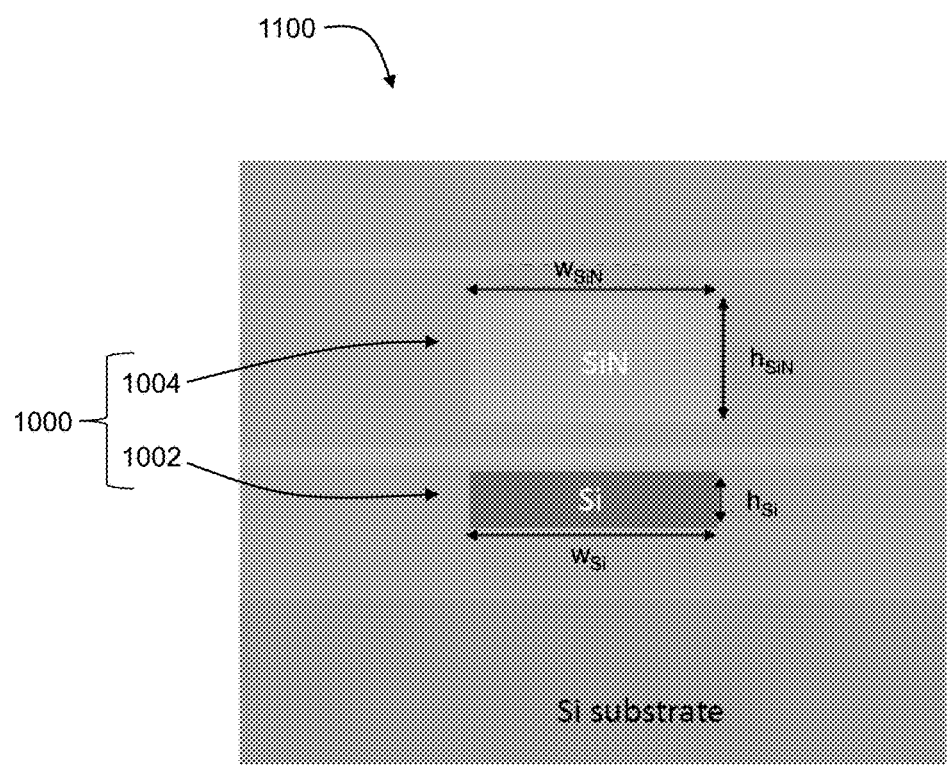
FIG. 11 illustrates an example optical system in which the SiN—Si multimode adiabatic coupler of FIG. 10 may be implemented.

FIG. 11 illustrates an example optical system 1100 in which the coupler 1000 of FIG. 10 may be implemented, arranged in accordance with at least one embodiment described herein. The optical system 1100 includes the coupler 1000 as well as the same or similar layers and/or elements as the optical systems 100, 400, 500, 800 described above, which will not be repeated. The waveguide core of the Si waveguide 1002 may include a height $h_{Si}$ and the width $w_{Si}$. The waveguide core of the SiN waveguide 1004 may include a height $h_{SiN}$ and the width $w_{SiN}$.

The height $h_{Si}$ of the core of the Si waveguide 1002 may be about 300 nm or some other value in an example implementation. Alternatively or additionally, the width $w_{Si}$ of the core of the Si waveguide 1002 may be about 100 nm to 1,000 nm (or 0.1 µm to 1 µm) depending on which part of the core of the Si waveguide 1002 is being measured. For instance, the tip of the core of the Si waveguide 1002 may be about 100 nm up to 120 nm which then tapers gradually up to 1 µm.

The height $h_{SiN}$ of the core of the SiN waveguide 1004 may be about 600 nm or some other value in an example implementation. Alternatively or additionally, the width $w_{SiN}$ of the core of the SiN waveguide 1004 may be about 250 nm to 1 µm depending on which part of the core of the SiN waveguide 1004 is being measured. For instance, the tip of the core of the SiN waveguide 1004 may be about 250 nm which then tapers gradually up to 1 µm. In other embodiments, the width and/or height $w_{Si}$, $w_{SiN}$, $h_{Si}$, and/or $h_{SiN}$ of the cores of the Si and SiN waveguides 1002 and 1004 may be different than the foregoing values. Hereinafter, measurements of various waveguides and/or tapers may be discussed, with the understanding that the measurements apply to the core of the corresponding waveguide even though the "core" may not be specified.

Figure 12A:
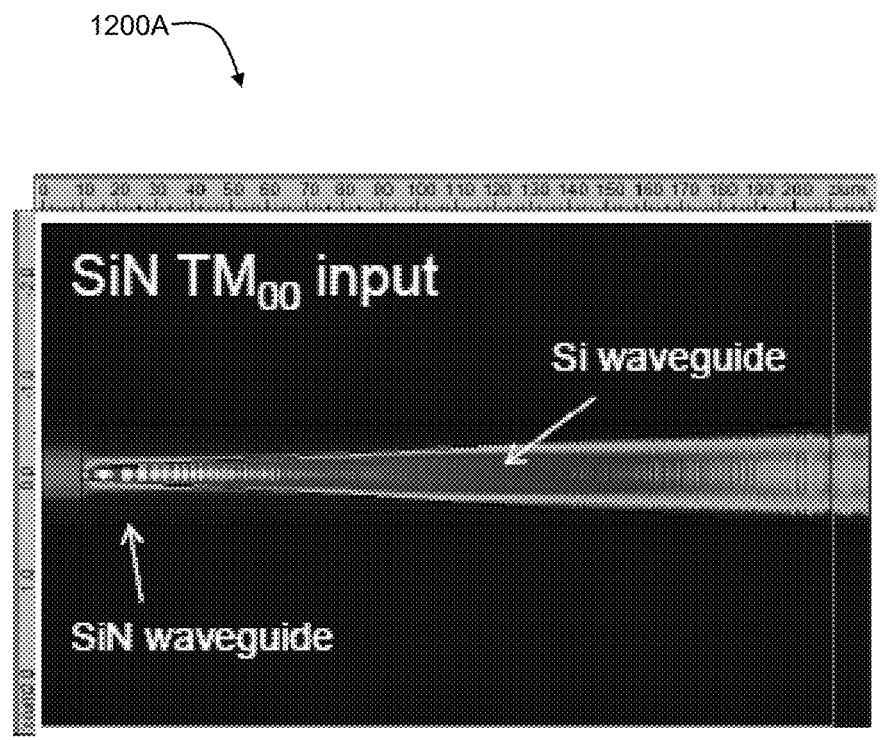
FIG. 12A includes a graphic that depicts simulated coupling of an input SiN $TM_{00}$ mode of light from a SiN waveguide to a multimode Si waveguide with a Si taper with a 100 nm tip width.

FIG. 12A includes a graphic 1200A that depicts simulated coupling of an input SiN $TM_{00}$ mode of light from a SiN waveguide to a multimode Si waveguide with a Si taper with a 100 nm tip width, arranged in accordance with at least one embodiment described herein. The SiN waveguide and Si waveguide of FIG. 12A may respectively include or correspond to the SiN waveguide 1004 and Si waveguide 1002 of FIGS. 10 and 11. It is assumed for the simulation of FIG. 12A that the Si taper of the Si waveguide gradually changes from a relatively narrow tip width of 100 nm to a multimodal waveguide with a width of about 1 µm. It is also assumed for FIG. 12A that the SiN waveguide has a cross-sectional shape that is rectangular (see FIG. 11) with a width of about 1 µm and a height of about 0.6 µm.

Figure 12B:
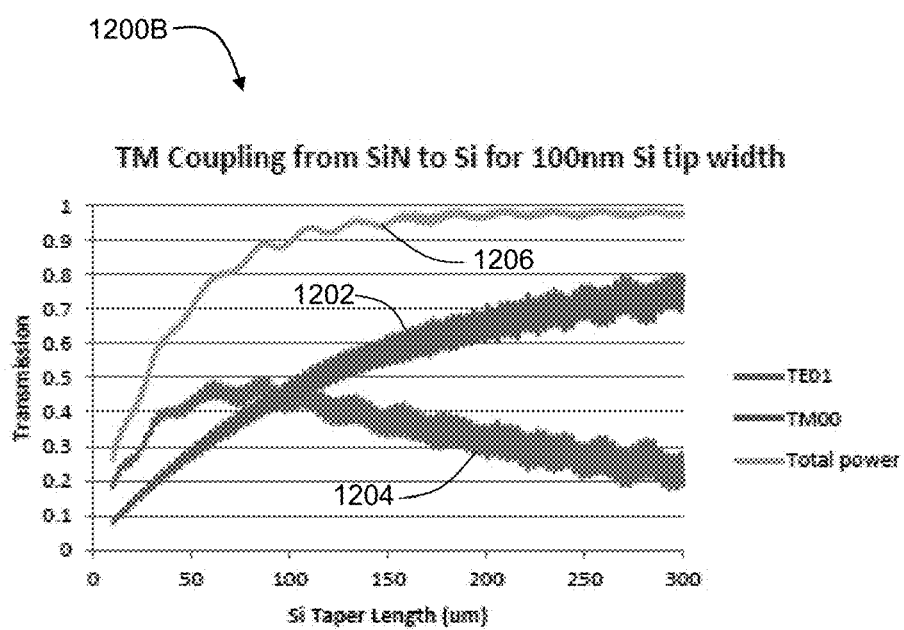
FIG. 12B includes a graphic that depicts simulated coupling in the Si waveguide of FIG. 12A as a function of Si taper length.

FIG. 12B includes a graphic 1200B that depicts simulated coupling in the Si waveguide of FIG. 12A as a function of Si taper length, arranged in accordance with at least one embodiment described herein. The simulation of FIG. 12B depicts simulated coupling outputs in the Si waveguide, where the simulated coupling outputs correspond to the SiN $TM_{00}$ input in the SiN waveguide. In particular, a first curve 1202 represents simulated coupling as a function of Si taper length for a $TM_{00}$ mode of light in the Si waveguide, a second curve 1204 represents simulated coupling as a function of Si taper length for a $TE_{01}$ mode of light in the Si waveguide, and a third curve 1206 represents simulated coupling as a function of Si taper length for total optical power (e.g., sum of $TM_{00}$ and $TE_{01}$ modes) in the Si waveguide. From FIG. 12B, it can be seen that the SiN $TM_{00}$ mode may couple to the Si $TE_{01}$ and $TM_{00}$ modes with about 98% coupling efficiency at Si taper lengths greater than or equal to 200 µm.

Figure 13A:
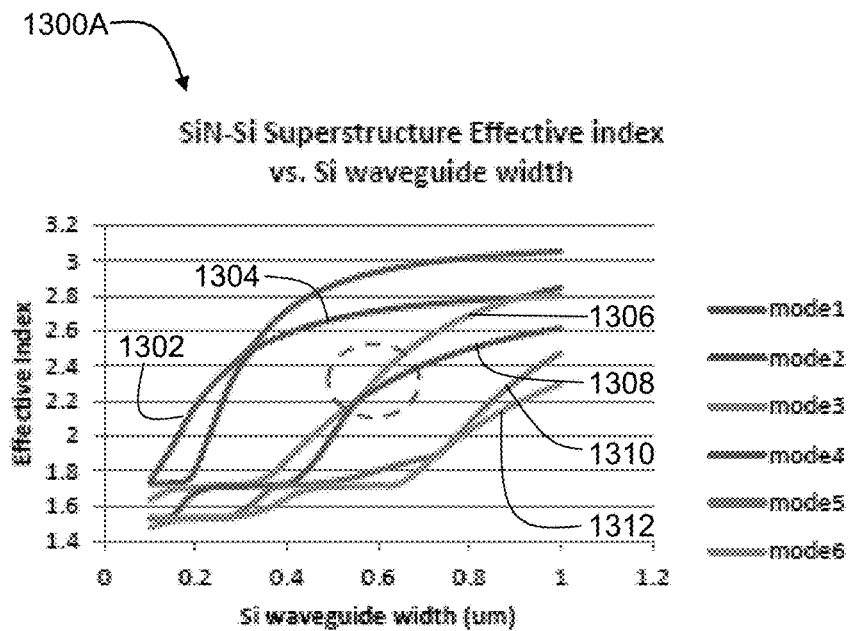
FIG. 13A is a graphic that depicts simulated SiN—Si superstructure effective index as a function of Si waveguide width for various optical modes.

Embodiments of the SiN—Si multimode adiabatic coupler described with respect to FIGS. 10-12B may be referred to as a SiN—Si superstructure. The SiN—Si superstructure has an effective index that may vary as a function of a width of the Si waveguide of the SiN—Si superstructure. FIG. 13A is a graphic 1300A that depicts simulated SiN—Si superstructure effective index as a function of Si waveguide width for various optical modes, arranged in accordance with at least one embodiment described herein. The range of Si waveguide widths used in the simulations of FIG. 13A is from 0.1 µm (100 nm) to 1 µm and corresponds to one range of Si waveguide widths for the Si taper 406 of FIG. 4—e.g., the Si taper 406 is 100 nm at its tip and the Si taper 406 gradually changes from 100 nm to 1 µm according to an example embodiment.

The optical modes simulated in FIG. 13A include mode1 (curve 1302), mode2 (curve 1304), mode3 (curve 1306), mode4 (curve 1308), mode5 (curve 1310), and mode6 (curve 1312), each of which is an optical mode simulated as being in the Si waveguide, and more particularly in the Si taper of the Si waveguide.

Figure 13B:
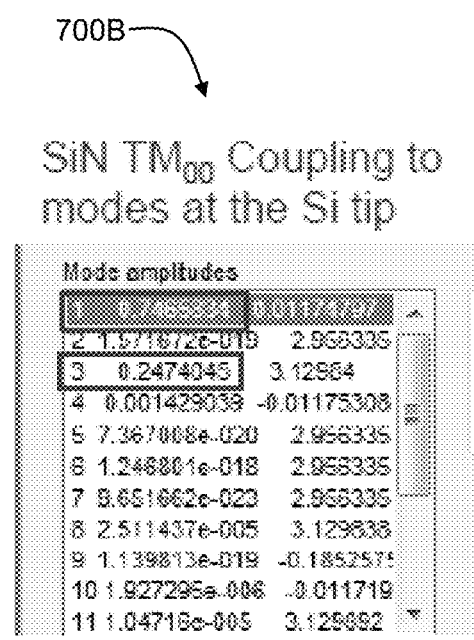
FIG. 13B is a graphic that depicts calculated amplitudes of each of the optical modes of FIG. 13A at the tip of the Si taper.

FIG. 13B is a graphic 1300B that depicts calculated amplitudes of each of the optical modes of FIG. 13A at the tip of the Si taper, arranged in accordance with at least one embodiment described herein. In particular, FIG. 13B depicts calculated amplitudes of each of the optical modes of FIG. 13A at a Si waveguide width of 0.1 µm, or 100 nm. It can be seen from FIG. 13B that most of the optical power is in mode1 ($TM_1$: 74.6%) and mode3 ($TM_2$: 24.7%) at the tip of the Si taper.

Figure 14:
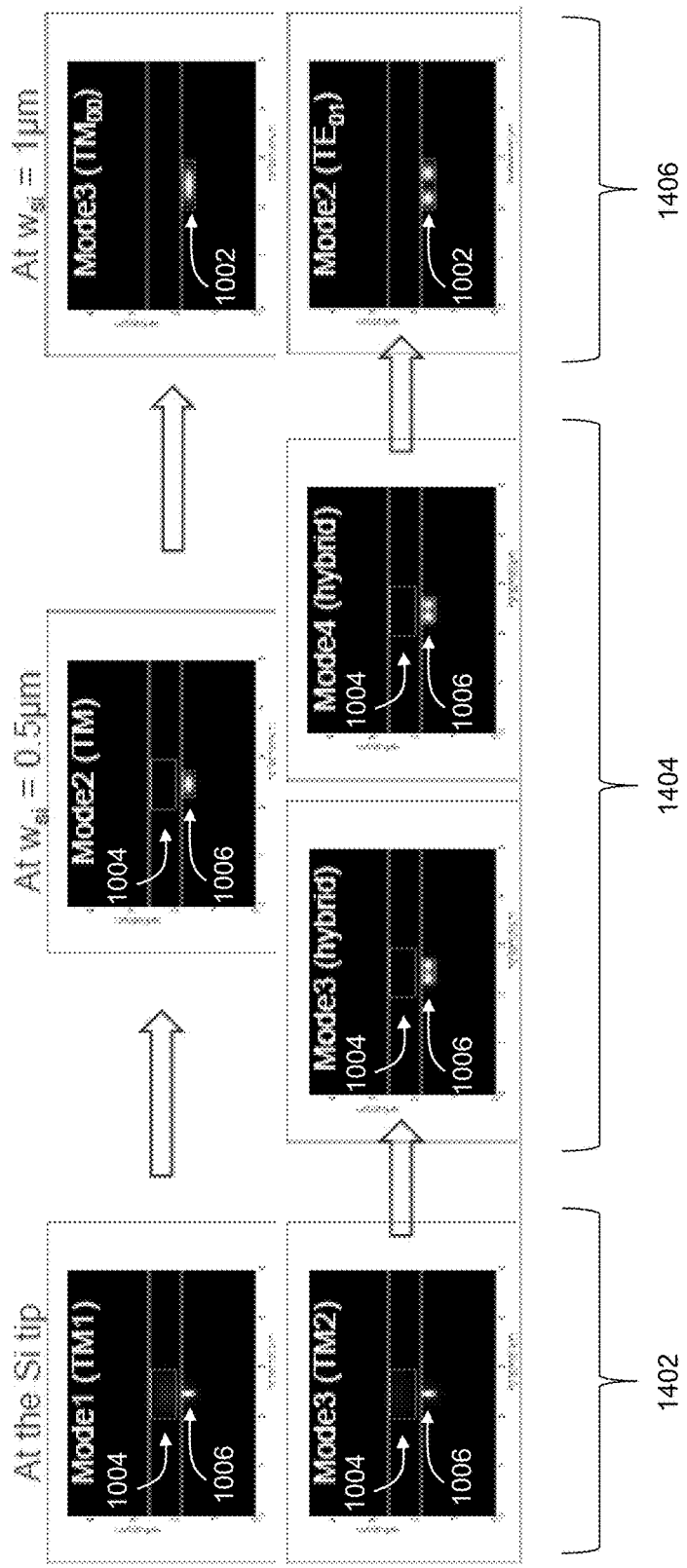
FIG. 14 includes various graphics that depict evolution of modes in the SiN—Si superstructure of the preceding figures.

FIG. 14 includes various graphics 1402, 1404, 1406 that depict evolution of modes in the SiN—Si superstructure discussed above, arranged in accordance with at least one embodiment described herein. Each graphic depicts simulated optical modes in the Si taper 1006 of FIG. 10. A first set of graphics 1402 depicts mode1 ($TM_1$) and mode3 ($TM_2$) at the tip of the Si taper 1006. A second set of graphics 1404 depicts mode2 (TM), mode3 (hybrid), and mode4 (hybrid) at a location in the Si taper 1006 in which the Si taper 1006 has a width of 0.5 µm. A third set of graphics 1406 depicts mode3 ($TM_{00}$) and mode2 ($TE_{01}$) after the Si taper 1006 and in the Si waveguide 1002 with a width of 1 μm in this example. It can be seen from FIG. 14 that the SiN $TM_{00}$ mode first couples to mode1 ($TM_1$: 74.6%) and mode3 ($TM_2$: 24.7%) at the tip of the Si taper 1006 and eventually evolves into mode3 ($TM_{00}$) and mode2 ($TE_{01}$) by the time it reaches the multimode Si waveguide 1002 through mode hybridization during the adiabatic Si taper 1006.

Figure 15:
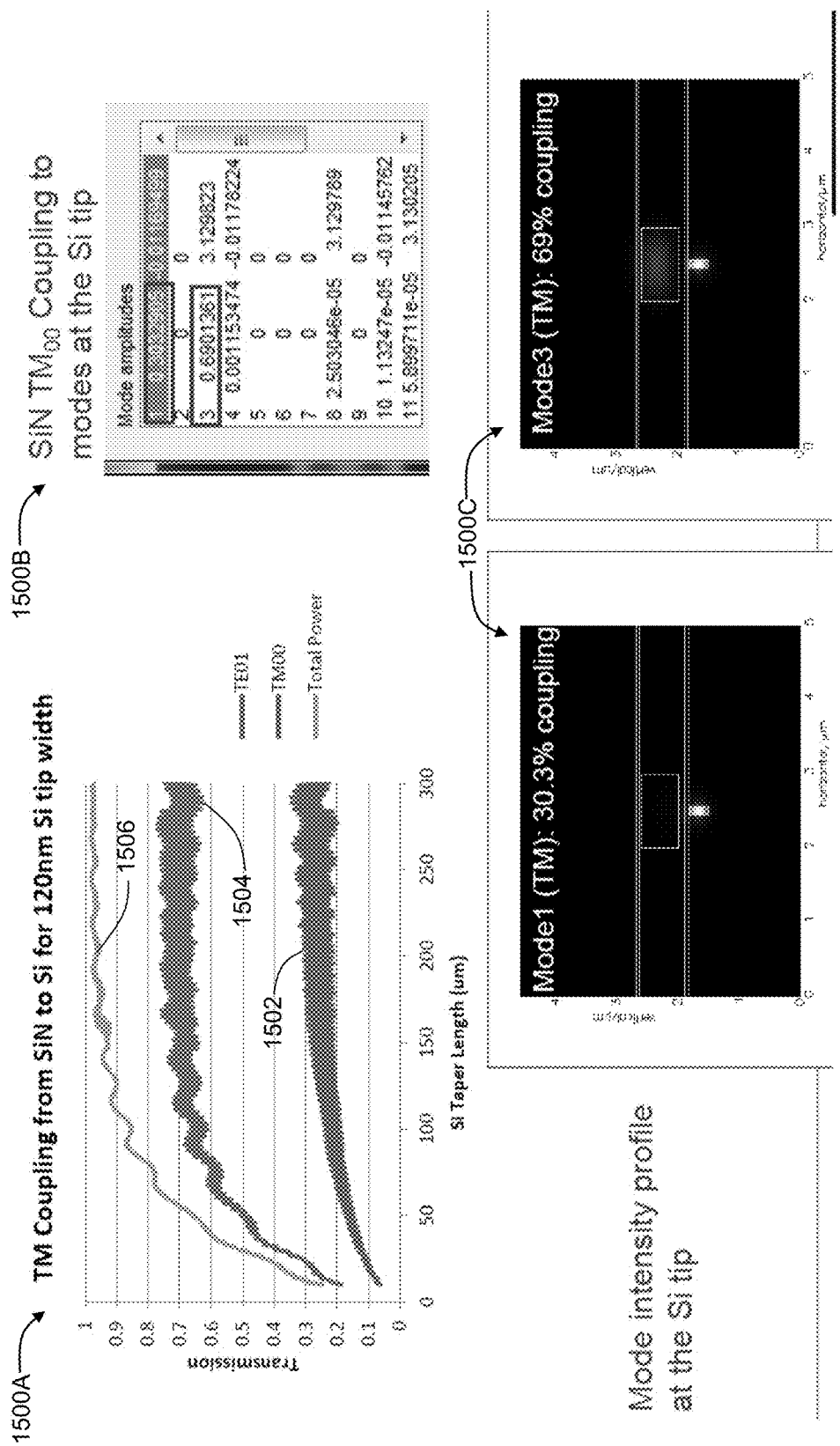
FIG. 15 includes various graphics in which it is assumed that a Si taper of a SiN—Si superstructure of the preceding figures tapers from 120 nm at the tip to 1 µm.

The simulations of FIGS. 12A-14 assume the Si taper 1006 tapers from 100 nm at the tip to 1 μm. FIG. 15 includes various graphics 1500A, 1500B, 1500C in which it is assumed that the Si taper 1006 tapers from 120 nm at the tip to 1 μm, arranged in accordance with at least one embodiment described herein. More particularly, the graphic 1500A of FIG. 15 is similar to the graphic 1200B of FIG. 12B but assuming the Si taper 1006 tapers from 120 nm at the tip to 1 μm instead of from 100 nm at the tip to 1 μm. Analogously, the graphic 1500B of FIG. 15 is similar to the graphic 1300B of FIG. 13B but assuming the Si taper 1006 tapers from 120 nm at the tip to 1 μm instead of from 100 nm at the tip to 1 μm. Analogously, the set of graphics 1500C of FIG. 15 are similar to the set of graphics 1402 of FIG. 14 but assuming the Si taper 1006 tapers from 120 nm at the tip to 1 μm instead of from 100 nm at the tip to 1 μm.

In the graphic 1500A, a first curve 1502 represents simulated coupling as a function of Si taper length for a $TM_{00}$ mode of light in the Si waveguide, a second curve 1504 represents simulated coupling as a function of Si taper length for a $TE_{01}$ mode of light in the Si waveguide, and a third curve 1506 represents simulated coupling as a function of Si taper length for total optical power (e.g., sum of $TM_{00}$ and $TE_{01}$ modes) in the Si waveguide. From the graphic 1500A of FIG. 15, it can be seen that the SiN $TM_{00}$ mode may couple to the Si $TE_{01}$ and $TM_{00}$ modes with about 96% coupling efficiency at Si taper lengths greater than or equal to about 200 μm.

The graphic 1500B depicts calculated amplitudes of each of the optical modes of FIG. 13A at a Si waveguide width of 0.12 μm, or 120 nm. It can be seen from the graphics 1500B and 1500C of FIG. 15 that within the tip of the Si taper, most of the optical power is in mode1 (30.3%) and mode3 (69%).

Figure 16:
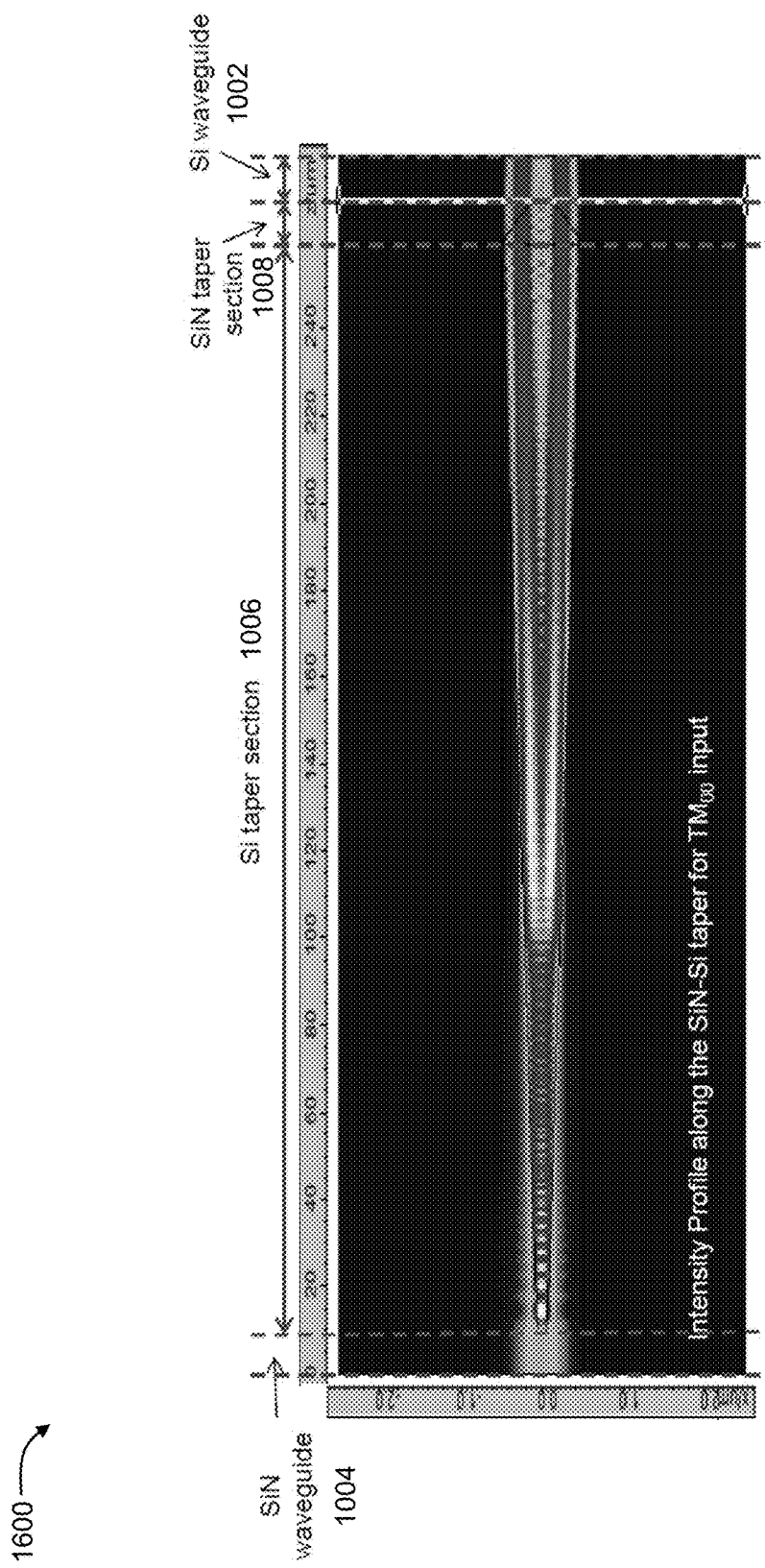
FIG. 16 includes a graphic that depicts simulated coupling of an input SiN $TM_{00}$ mode of light from a SiN waveguide to a multimode Si waveguide with a Si taper with a 120 nm tip width.

FIG. 16 includes a graphic 1600 that depicts simulated coupling of an input SiN $TM_{00}$ mode of light from a SiN waveguide to a multimode Si waveguide with a Si taper with a 120 nm tip width, arranged in accordance with at least one embodiment described herein. The graphic 1600 of FIG. 16 is similar to the graphic 1200A of FIG. 12A except that for the graphic 1600 it is assumed the Si taper 1006 tapers from 120 nm at the tip to 1 μm whereas for the graphic 1200A it is assumed that the Si taper 1206 tapers from 100 nm at the tip to 1 μm.

The SiN—Si adiabatic coupler of FIG. 16 is an implementation of the coupler 1000 of FIG. 10 with the following parameters. From left to right, the Si taper 1006 linearly tapers from 120 nm at the tip to 1 μm over a length of at least 200 μm, such as 250 μm in the example of FIG. 16. From left to right, the SiN waveguide 1004 is maintained at a width of 1 μm over the length of the Si taper 406 and then the SiN taper 1008 linearly tapers from 1 μm to 250 nm over a length of 10 μm while the Si waveguide 1002 is maintained at 1 μm in width. The SiN $TM_{00}$ optical mode may be transferred to Si $TE_{01}$ and Si $TM_{00}$ optical modes with total transmission greater than 96% at 200 μm Si taper length or longer. These and/or other optical modes in the Si waveguide 1002 may be coupled out of the Si waveguide 1002 into a Ge detector or other optical receiver.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An optical system comprising:
   a silicon (Si) substrate;
   a buried oxide (BOX) layer formed on the Si substrate;
   a silicon nitride (SiN) waveguide layer formed above the BOX layer;
   a SiN waveguide formed in the SiN waveguide layer, the SiN waveguide including a tapered section;
   an interposer waveguide adiabatically coupled to the SiN waveguide to form a SiN-interposer adiabatic coupler that includes at least the tapered section of the SiN waveguide;
   a cavity formed in the Si substrate at least beneath the SiN-interposer adiabatic coupler;
   a Si waveguide layer formed above the BOX layer and below the SiN waveguide layer; and
   a multimode Si waveguide formed in the Si waveguide layer, the multimode Si waveguide including a Si taper with a tip width greater than or equal to 100 nanometers (nm);
   wherein:
   the multimode Si waveguide is adiabatically coupled to a multimode SiN waveguide formed in the SiN waveguide layer; and
   the multimode SiN waveguide includes a SiN taper that does not overlap the Si taper.

2. The optical system of claim 1, wherein a width of the cavity formed in the Si substrate is at least 20 μm.

3. The optical system of claim 1, further comprising a low index material backfilled into the cavity formed in the Si substrate.

4. The optical system of claim 3, wherein the low index material has an index of refraction between 1.4 and 1.6.

5. The optical system of claim 3, wherein the low index material comprises epoxy.

6. The optical system of claim 1, wherein a length of the cavity formed in the Si substrate is on an order of an interaction length of the SiN-interposer adiabatic coupler.

7. The optical system of claim 1, wherein a thickness of remaining Si substrate in a light propagation direction between an end of the cavity and an edge of the Si substrate is at least 250 micrometers.

8. The optical system of claim 1, further comprising a plurality of SiN-interposer adiabatic couplers that includes the SiN-interposer adiabatic coupler, wherein the cavity is formed in the Si substrate at least beneath two of the plurality of SiN-interposer adiabatic couplers.

9. The optical system of claim 8, wherein a width of the cavity is less than 1 millimeter.

10. The optical system of claim 1, further comprising an oxide overlay formed between a top of a SiN core of the SiN waveguide and a bottom of the interposer waveguide.

11. An optical system comprising:
    a silicon (Si) substrate;
    a buried oxide (BOX) layer formed on the Si substrate;
    a silicon nitride (SiN) waveguide layer formed above the BOX layer;
    a SiN waveguide formed in the SiN waveguide layer, the SiN waveguide including a tapered section;

an interposer waveguide adiabatically coupled to the SiN waveguide to form a SiN-interposer adiabatic coupler that includes at least the tapered section of the SiN waveguide; and a cavity formed in the Si substrate at least beneath the SiN-interposer adiabatic coupler, wherein a thickness of remaining Si substrate in a light propagation direction between an end of the cavity and an edge of the Si substrate is at least 250 micrometers.

12. The optical system of claim 11, wherein a width of the cavity formed in the Si substrate is at least 20 μm.

13. The optical system of claim 11, further comprising:
a Si waveguide layer formed above the BOX layer and below the SiN waveguide layer; and
a multimode Si waveguide formed in the Si waveguide layer, the multimode Si waveguide including a Si taper with a tip width greater than or equal to 100 nanometers (nm);
wherein:
the multimode Si waveguide is adiabatically coupled to a multimode SiN waveguide formed in the SiN waveguide layer; and
the multimode SiN waveguide includes a SiN taper that does not overlap the Si taper.

14. The optical system of claim 11, wherein a length in the light propagation direction of the cavity formed in the Si substrate is on an order of an interaction length of the SiN-interposer adiabatic coupler.

15. The optical system of claim 11, further comprising a low index material backfilled into the cavity formed in the Si substrate, wherein the low index material comprises epoxy and has an index of refraction between 1.4 and 1.6.

16. An optical system comprising:
a silicon (Si) substrate;
a buried oxide (BOX) layer formed on the Si substrate;
a silicon nitride (SiN) waveguide layer formed above the BOX layer;
a SiN waveguide formed in the SiN waveguide layer, the SiN waveguide including a tapered section;
an interposer waveguide adiabatically coupled to the SiN waveguide to form a SiN-interposer adiabatic coupler that includes at least the tapered section of the SiN waveguide; and
a cavity formed in the Si substrate at least beneath the SiN-interposer adiabatic coupler, wherein the cavity extends vertically downward from a bottom of the BOX layer through the Si substrate.

17. The optical system of claim 16, wherein a length of the cavity formed in the Si substrate is on an order of an interaction length of the SiN-interposer adiabatic coupler and is at least 1.3 millimeters.

18. The optical system of claim 16, further comprising:
a Si waveguide layer formed above the BOX layer and below the SiN waveguide layer; and
a multimode Si waveguide formed in the Si waveguide layer, the multimode Si waveguide including a Si taper with a tip width greater than or equal to 100 nanometers (nm);
wherein:
the multimode Si waveguide is adiabatically coupled to a multimode SiN waveguide formed in the SiN waveguide layer; and
the multimode SiN waveguide includes a SiN taper that does not overlap the Si taper.

19. The optical system of claim 16, wherein a width of the cavity formed in the Si substrate is at least 20 μm.

20. The optical system of claim 16, wherein a thickness of remaining Si substrate in a light propagation direction between an end of the cavity and an edge of the Si substrate is at least 250 micrometers.

* * * * *